United States Patent
Shibata et al.

(10) Patent No.: US 9,172,072 B2
(45) Date of Patent: Oct. 27, 2015

(54) BATTERY COMPRISING GAS ABSORBENT MATERIAL AND BATTERY SYSTEM

(75) Inventors: Yohei Shibata, Kyoto (JP); Yoshinobu Yasunaga, Kyoto (JP); Tsutomu Watanabe, Kyoto (JP); Tokuo Inamasu, Kyoto (JP); Ryoichi Okuyama, Kyoto (JP); Minoru Yagi, Tokyo (JP); Hiroshi Obuse, Tokyo (JP); Shinichi Wada, Tokyo (JP)

(73) Assignees: GS Yuasa International Ltd, Kyoto (JP); KURITA WATER INDUSTRIES LTD., Tokyo (JP)

( * ) Notice: Subject to any disclaimer, the term of this patent is extended or adjusted under 35 U.S.C. 154(b) by 324 days.

(21) Appl. No.: 13/819,610

(22) PCT Filed: Aug. 26, 2011

(86) PCT No.: PCT/JP2011/069341
§ 371 (c)(1),
(2), (4) Date: Feb. 27, 2013

(87) PCT Pub. No.: WO2012/029669
PCT Pub. Date: Mar. 8, 2012

(65) Prior Publication Data
US 2013/0171483 A1    Jul. 4, 2013

(30) Foreign Application Priority Data
Sep. 2, 2010 (JP) ................................ 2010-196886

(51) Int. Cl.
H01M 2/12 (2006.01)
H01M 2/02 (2006.01)
(Continued)

(52) U.S. Cl.
CPC .............. *H01M 2/1258* (2013.01); *H01M 2/12* (2013.01); *H01M 10/52* (2013.01); *H01M 2/1235* (2013.01); *H01M 2/345* (2013.01); *H01M 2/348* (2013.01)

(58) Field of Classification Search
CPC ... H01M 2/12; H01M 2/1258; H01M 2/1235; H01M 10/52; H01M 2/348; H01M 2/345
See application file for complete search history.

(56) References Cited

U.S. PATENT DOCUMENTS 2,106,222 A * 1/1938 Matthew .......................... 429/82
6,106,972 A * 8/2000 Kokubo et al. ................ 429/120
(Continued)

FOREIGN PATENT DOCUMENTS

DE        19829293 A1    1/1999
DE    102009000660 A1    8/2010
(Continued)

OTHER PUBLICATIONS

Machine Translation of: Yamahira et al. (JP 07/192775), Jul. 28, 1995.*
(Continued)

*Primary Examiner* — Kenneth Douyette
(74) *Attorney, Agent, or Firm* — Rankin, Hill & Clark LLP

(57) ABSTRACT

[PROBLEM] In space-conservative fashion, at low cost, and with high efficiency, to carry out absorption of gas produced at the interior of a battery.
[SOLUTION MEANS] Secondary battery 21 is provided with case 3 in which positive electrode 10 and negative electrode 11 are sealed together with electrolyte, and with explosion prevention valve 4 for allowing escape of high-pressure gas present at the interior of case 3 when pressure within case 3 rises; and is further provided with gas absorber 13 or 14 for absorbing high-pressure gas. Gas absorber 13, includes gas-absorbent material 6 and capsule 5, which comprises hot-melt material, and is provided within case 3, this capsule 5 including, at the interior thereof, gas-absorbent material 6. Furthermore, gas absorber 14, which may be provided outside case 3, may include gas-absorbent material 6; cartridge case 14*a* which houses, at the interior thereof, gas-absorbent material 6; gas inlet valve 14*b* for causing high-pressure gas to flow thereinto; and gas outlet valve 14*c* for causing high-pressure gas to flow out therefrom.

11 Claims, 13 Drawing Sheets

(51) Int. Cl.
  *H01M 10/52*   (2006.01)
  *H01M 2/34*    (2006.01)

(56) References Cited

U.S. PATENT DOCUMENTS

| | | | |
|---|---|---|---|
| 7,776,465 | B1 | 8/2010 | Hatazawa et al. |
| 2003/0049519 | A1 | 3/2003 | Ishida et al. |
| 2005/0155217 | A1 | 7/2005 | Ishida et al. |
| 2006/0168800 | A1 | 8/2006 | Ishida et al. |
| 2011/0111270 | A1 | 5/2011 | Osswald |
| 2011/0129723 | A1* | 6/2011 | Tsuchida .................... 429/163 |
| 2012/0070703 | A1 | 3/2012 | Wahl |

FOREIGN PATENT DOCUMENTS

| | | |
|---|---|---|
| JP | 07-192775 | 7/1995 |
| JP | 11-317334 | 11/1999 |
| JP | 200012082 | 1/2000 |
| JP | 2001-155790 | 6/2001 |
| JP | 2003-77549 | 3/2003 |
| JP | 2006-228610 | 8/2006 |
| JP | 2008-016346 | 1/2008 |
| JP | 201160554 | 3/2011 |
| JP | 2011-090929 | 5/2011 |
| WO | 2007/062125 | 5/2007 |
| WO | 2008/148781 | 12/2008 |
| WO | 2009/156223 | 12/2009 |

OTHER PUBLICATIONS

International Search Report filed in PCT/JP2011/069341.
Third Party Observation for application No. EP20110821686 dated Feb. 18, 2015.
Extended European Search Report dated May 7, 2015 issued in the corresponding European patent application No. 11821686.0.

\* cited by examiner (a)

(b)

(a)

(b)

(a)

(b)

BATTERY COMPRISING GAS ABSORBENT MATERIAL AND BATTERY SYSTEM

TECHNICAL FIELD

The present invention relates to a battery and battery system provided with ability to prevent expulsion to the exterior of electrolyte and/or gas produced at the interior under abnormal circumstances.

BACKGROUND ART

In the event of overcharging, short circuit, or other such abnormality at a lithium ion battery or other such nonaqueous electrolyte secondary battery, internal temperature rises, in accompaniment to which electrolyte evaporates and internal pressure rises. Nonaqueous electrolyte secondary batteries are therefore provided with explosion prevention valves (safety valves), these being designed so as to allow electrolyte vapor, gaseous decomposition products thereof, and the like to be expelled to the exterior via the explosion prevention valve in the unlikely event that a prescribed internal pressure is exceeded, and various expulsion-preventing contrivances have been developed for preventing expulsion to the exterior of such gases.

As one such expulsion prevention technique, for example, the "secondary battery pack including a secondary battery" described at Patent Reference No. 1 is provided with a filter unit, adsorption by this filter unit of flammable substances expelled from the secondary battery preventing expulsion thereof to the exterior. Furthermore, the "secondary battery" described at Patent Reference No. 2 is provided with a gas-absorbing element including gas-absorbent material at the interior thereof, expulsion of gas and so forth being prevented by suppressing increase in internal pressure of the battery in stable fashion over long periods of time.

PRIOR ART REFERENCES

Patent References

PATENT REFERENCE NO. 1: Japanese Patent Application Publication Kokai No. 2006-228610
PATENT REFERENCE NO. 2: Japanese Patent Application Publication Kokai No. 2003-77549

SUMMARY OF INVENTION

Problem to be Solved by Invention

However, because there are many types of gas produced at the interior of nonaqueous electrolyte secondary batteries, including hydrocarbon gases, carbon monoxide, carbon dioxide, hydrogen, and so forth, and because these are also produced in large amount, even where conventional gas-absorbent materials might be able to absorb some of these gases, to absorb all of these gases in sufficient amount at adequate absorption rate, there has been a tendency for the absorption mechanism employed to become large. Note, moreover, that this phenomenon becomes more prominent as nonaqueous electrolyte secondary battery size is increased, as nonaqueous electrolyte secondary battery number is increased, and/or as absorptive capacity of gas-absorbent material is decreased.

Furthermore, not only must such gas absorptive capacity for prevention of expulsion be available at high temperature and high pressure but it must also be maintained at high levels under all manner of circumstances despite passage of long periods of time and so forth, but because it is unclear whether such absorption of gas will occur even once during the course of the life of the nonaqueous electrolyte secondary battery, there has also been a need for it to be implemented at low cost.

Furthermore, while absorptive capacity of gas-absorbent materials has been improved as a result of development activities, not only has it been the case that the manner in which such gas-absorbent materials have been used has interfered with ability for such absorptive capacity to be adequately exhibited when needed but there are also cases in which battery characteristics have been affected thereby. For example, at the "secondary battery" described at Patent Reference No. 2, because gas-absorbent material is provided at the interior and gases are constantly being absorbed thereby, deterioration of the gas-absorbent material has proceeded correspondingly rapidly; moreover, it has been necessary to redesign the manner in which this is arranged, the amount thereof which is used, and so forth in correspondence to the gas-absorbent material used whenever different battery characteristics are required.

The foregoing is not limited to secondary batteries but also applies generally, to greater or less degree, to any battery at which internal temperature and/or internal pressure rises in the event of short circuit or other such abnormality.

The present invention was conceived in light of the foregoing problems, it being a primary technical object thereof to, in space-conservative fashion, at low cost, and with high efficiency, carry out absorption of gas produced at the interior of a battery. In particular, it is a primary technical object thereof to provide a battery and a battery system such as will make it possible for gas-absorbent material(s) having superior gas absorptive capacity to be provided in configuration(s) suited to battery interior(s) and/or exterior(s).

Means for Solving Problem

A battery associated with the present invention comprises a case in which a positive electrode and a negative electrode are sealed together with electrolyte; an explosion prevention valve for allowing escape of high-pressure gas at an interior of the case when pressure within the case rises; and a gas absorber for absorbing the high-pressure gas. Absorption of high-pressure gas by the gas absorber will make it possible to prevent expulsion of high-pressure gas.

It is preferred that the battery associated with the present invention be such that the gas absorber includes gas-absorbent material and a capsule comprising hot-melt material; and is provided within the case; and the capsule includes, at an interior thereof, the gas-absorbent material. In the present specification, such a gas absorber is referred to as a "capsule-type gas absorber." Capsule-type gas absorbers are constituted such that the capsule melts when the temperature within the battery case is greater than or equal to a prescribed value. As a result, gas-absorbent material becomes spread within the interior of the battery case and the high-pressure gas is absorbed thereby, making it possible to prevent expulsion of the high-pressure gas to the exterior.

It is preferred that the capsule-type gas absorber be installed in the vicinity of the explosion prevention valve in such fashion as to cover the explosion prevention valve. Adoption of such a constitution will make it possible for high-pressure gas which attempts to pass through the explosion prevention valve to be absorbed by the gas-absorbent material of the capsule-type gas absorber, and will make it possible to prevent expulsion to the exterior via the explosion prevention valve.

A battery associated with the present invention may be such that the positive electrode and the negative electrode are each wound together with a separator to form a core; and the capsule-type gas absorber is installed at the core. As a result of adoption of such a constitution, because the capsule-type gas absorber is housed within the dead space constituted by the core, it is possible to cause an adequate amount of the gas-absorbent material to be retained therein with almost no alteration to the structure of the battery.

Furthermore, a plurality of capsule-type gas absorbers may be installed in distributed fashion throughout the entire interior of the battery case associated with the present invention. Such a constitution will make it possible to speed up contact between gas-absorbent material and high-pressure gas throughout the entire interior of the case.

The battery associated with the present invention may be such that the gas absorber includes gas-absorbent material; a cartridge case which houses, at an interior thereof, the gas-absorbent material; a gas inlet valve for causing the high-pressure gas to flow thereinto; and a gas outlet valve, which opens at a higher pressure than a pressure at which the gas inlet valve opens, for causing the high-pressure gas to flow out therefrom; and may be such that the gas absorber is provided outside the case. To increase the length of time that the gas-absorbent material is in contact with the expelled gas within the cartridge case, it is preferred that the gas outlet valve be set to open at a pressure that is higher than the pressure at which the gas inlet valve is set to open. In the present specification, such a gas absorber is referred to as a "cartridge-type gas absorber." Employment of a cartridge-type gas absorber makes it possible to handle the gas-absorbent material(s), the cartridge case(s), the gas inlet valve(s), and the gas outlet valve(s) as a single integral unit, and also facilitates replacement thereof.

It is preferred that the cartridge-type gas absorber further include a first connector for attachment to and detachment from the battery; and that the gas inlet valve be directly connected to the explosion prevention valve by means of the first connector. Adoption of such constitution will make it possible for the cartridge-type gas absorber to be easily attached to and detached from the battery. Furthermore, because the cartridge-type gas absorber is directly connected to the explosion prevention valve, this makes other constituents for prevention of expulsion of high-pressure gas to the exterior unnecessary; and even when the gas absorber is installed at the battery exterior, it is possible for the overall constitution to be made compact.

The cartridge-type gas absorber may further include a second connector for connecting the gas inlet valve and the gas outlet valve. Because such a constitution will make it possible to mutually connect a plurality of cartridge-type gas absorbers, this will permit improvement in overall gas absorptive capacity.

It is preferred that the gas-absorbent material at the cartridge-type gas absorber occupy 50 percent to 90 percent of the entire volume enclosed by the cartridge case. Such a constitution will make it possible for gas-absorbent material to be retained within the container enclosure and for the area over which contact with high-pressure gas is made to be increased. The cartridge-type gas absorber will therefore make it possible to increase gas absorptive capacity.

It is preferred that the cartridge-type gas absorber be such that formed at the cartridge case is a passage for causing high-pressure gas to flow up and down therewithin; and the gas-absorbent material is supported at the interior of the passage. Because such a constitution will make it possible to increase the length of time that the gas-absorbent material is in contact with the high-pressure gas, this will permit improvement in overall gas absorptive capacity.

A battery system associated with the present invention comprises a plurality of batteries; a cartridge-type gas absorber; and a tubing manifold equipped with a plurality of gas inlet orifices and a gas outlet orifice. The cartridge-type gas absorber further comprises a third connector for attachment to and removal from the tubing manifold; the respective explosion prevention valves are connected to the gas inlet orifices of the tubing manifold; and the gas outlet orifice of the tubing manifold is connected to the gas inlet valve of the cartridge-type gas absorber by means of the third connector. Such a constitution will make it possible for high-pressure gas expelled from the plurality of batteries to be absorbed in collective fashion by the cartridge-type gas absorber.

The tubing manifold may further comprise heat-dissipating means 15a for cooling expelled electrolyte and a gas component; and liquid storage means 17 that stores a liquefied component is provided between the tubing manifold and the gas absorber. As a result of adoption of such a constitution, because gas component(s) liquefied as a result of cooling by heat-dissipating means 15a are removed by liquid storage means 17, the cartridge-type gas absorber need absorb only the other gas component(s), permitting the cartridge-type gas absorber to be used efficiently. For this reason, it is possible to increase gas absorptive capacity of the overall battery system.

While activated carbon, zeolite, ion-exchange resin, and/or the like may be employed as the foregoing gas-absorbent material, employment of a molecular-compound-forming material is preferred. "Molecular-compound-forming material" refers to a type of addition compound which is formed when one compound becomes enclosed by the space(s) within the three-dimensional crystal lattice structure of another compound. This being the case, the constitution of molecular-compound-forming materials being such that while there are prescribed conditions that must be met and thus it will not be true in every situation, nonetheless combination of compounds will make it possible for a wide variety of gases to be effectively absorbed, and furthermore, it will be possible for the gas-absorbent material itself to be made compact.

Benefit of Invention

Because it permits installation of gas absorber(s) including gas-absorbent material(s) in configuration(s) suited to battery interior(s) and/or exterior(s), the present invention makes it possible to cause high-pressure gas(es) produced at interior(s) of a battery or batteries to be absorbed and makes it possible to cause expulsion of high-pressure gas(es) to the exterior to be prevented, in more space-conservative fashion, at lower cost, and with higher efficiency than was the case conventionally. Moreover, where molecular-compound-forming material(s) are employed at gas-absorbent material(s), because this will make it possible to increase gas absorptive capacity while making capsule-type gas absorber(s) more compact, one can expect to achieve even greater prevention of expulsion of high-pressure gas(es) to the exterior.

EMBODIMENTS FOR CARRYING OUT INVENTION

Below, embodiments of the present invention are described in detail with reference to the drawings. Note, however, that each of the respective embodiments is exemplary and should not be interpreted in such fashion as to limit the present invention.

First Embodiment

Nonaqueous Electrolyte Secondary Battery

A nonaqueous electrolyte secondary battery will first be briefly described below.

Figure 12:
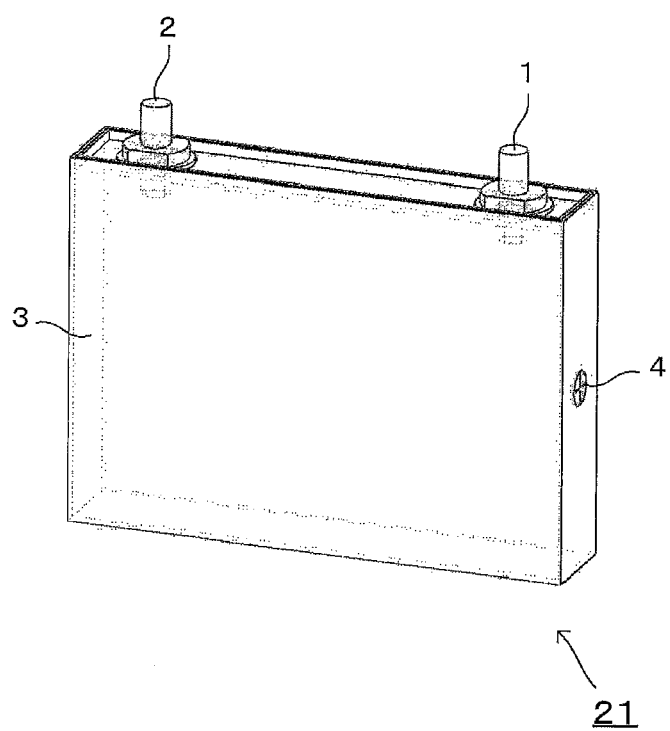
FIG. 12 Perspective view showing the external appearance of a nonaqueous electrolyte secondary battery.

FIG. 12 is a perspective view showing the external appearance of a nonaqueous electrolyte secondary battery. As shown in FIG. 12, a lithium ion battery or other such nonaqueous electrolyte secondary battery 21 is provided with positive electrode terminal 1, negative electrode terminal 2, battery case 3, and explosion prevention valve 4. Nonaqueous electrolyte secondary battery 21 houses an electrode assembly, not shown, within battery case 3. The electrode assembly is constructed such that a positive electrode sheet and a negative electrode sheet are wound together such that a separator intervenes therebetween, positive electrode terminal 1 being electrically connected to the positive electrode sheet, and negative electrode terminal 2 being electrically connected to the negative electrode sheet. Battery case 3 might, for example, be a rectangular container made of aluminum or stainless steel (SUS). When pressure within battery case 3 rises, explosion prevention valve 4 serves to vent that pressure to the exterior. For a lithium ion battery, explosion prevention valve 4 is typically set to open at approximately 0.5 [MPa] to 1.0 [MPa]. The material used for explosion prevention valve 4, like battery case 3, may be aluminum or stainless steel. Furthermore, as material for explosion prevention valve 4, besides nickel or other such metal, organic materials and inorganic materials may be used, use being possible so long as the material has strength sufficient to prevent rupture below a prescribed pressure, and so long as the material meets a number of conditions including that it not be corroded by electrolyte.

Figure 13:
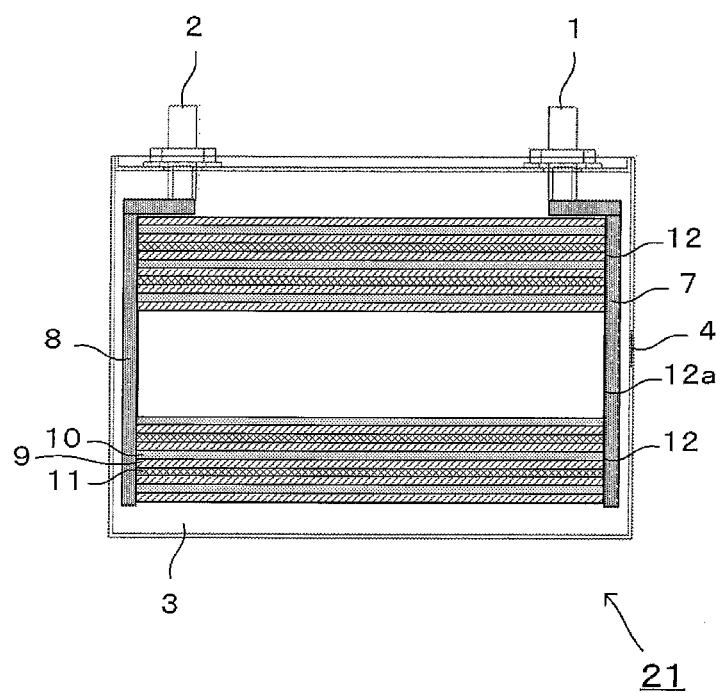
FIG. 13 Drawing showing the internal structure of a nonaqueous electrolyte secondary battery.

FIG. 13 is a sectional view, as seen from the front, being a drawing showing the internal structure of a nonaqueous electrolyte secondary battery. As shown in FIG. 13, nonaqueous electrolyte secondary battery 21 is, besides the constitution shown in FIG. 12, provided with positive electrode current collector 7, negative electrode current collector 8, and electrode assembly 12. Furthermore, electrode assembly 12 is provided with separator 9, positive electrode sheet 10, and negative electrode sheet 11, being constructed such that positive electrode sheet 10 and negative electrode sheet 11 are wound together such that separator 9 intervenes therebetween. At electrode assembly 12, note that this winding together results in formation of wound core 12a.

Positive electrode sheet 10 is a current collector that has positive electrode compound on both faces thereof. This current collector might, for example, be aluminum foil of thickness 20 [μm], and the paste-like positive electrode compound might be prepared by kneading together the mixture obtained following addition of polyvinylidene difluoride serving as binder and acetylene black serving as electrically conductive material to lithium cobalt oxide ($LiCoO_2$), which is a lithium-containing oxide of a transition metal. Moreover, positive electrode sheet 10 may be obtained in accordance with a procedure in which this paste-like positive electrode compound is applied to both faces of the aluminum foil and is dried and subjected to working by rolling, following which this is cut into strip-like pieces.

Negative electrode sheet 11 is a current collector that has negative electrode compound on both faces thereof. This current collector might, for example, be copper foil of thickness 10 [μm], and the paste-like negative electrode compound might be prepared by kneading together the mixture obtained following addition of polyvinylidene fluoride serving as binder to graphite powder. Moreover, negative electrode sheet 11 may be obtained in accordance with a procedure in which this paste-like negative electrode compound is applied to both faces of the copper foil and is dried and subjected to working by rolling, following which this is cut into strip-like pieces.

A porous membrane is used as separator 9. For example, a microporous membrane made of polyethylene may be used as separator 9. Furthermore, as electrolyte with which the separator is permeated, a solution obtained by addition of 1 [mol/l] of lithium hexafluorophosphate to a solution containing a mixture of ethylene carbonate (EC), ethyl methyl carbonate (EMC), and dimethyl carbonate (DMC) in the ratio 1:1:1 may, for example, be used.

—Gas-Absorbent Material Installation Modes—

While nonaqueous electrolyte secondary battery 21 allows gas produced at the interior thereof to be expelled therefrom via explosion prevention valve 4, the present inventors have conceived of means by which gas-absorbent material is installed in various modes to minimize expulsion of such gas to the exterior. Below, modes in which gas-absorbent material may be installed at the interior of nonaqueous electrolyte secondary battery 21 are first described.

Figure 1:
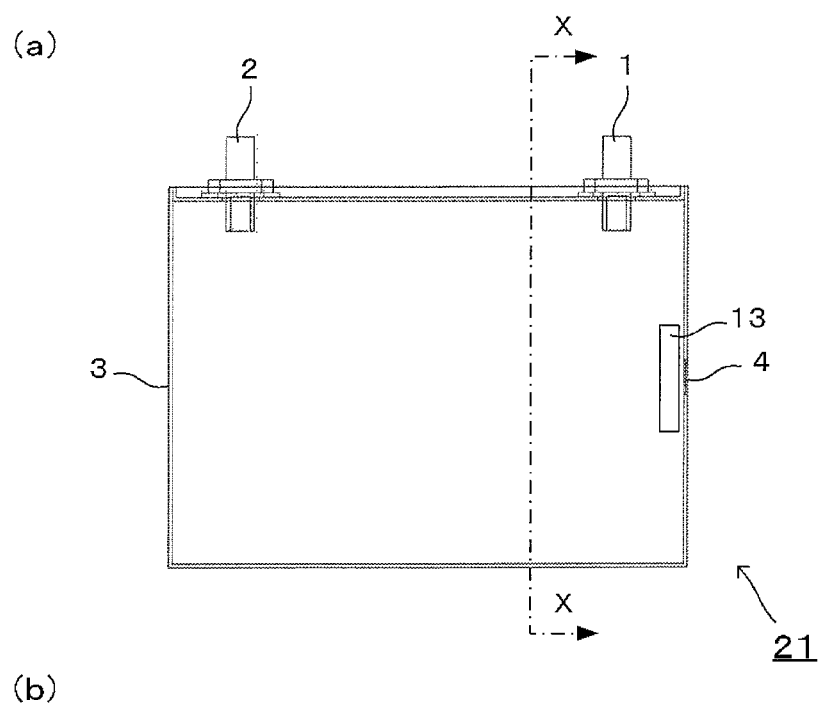
FIG. 1 Drawing showing an example in which capsule-type gas absorber(s) is/are installed at a nonaqueous electrolyte secondary battery. (a) is a view as seen from the front; (b) is a view as seen in the direction of arrows X-X at FIG. 1 (a).
Figure 1:
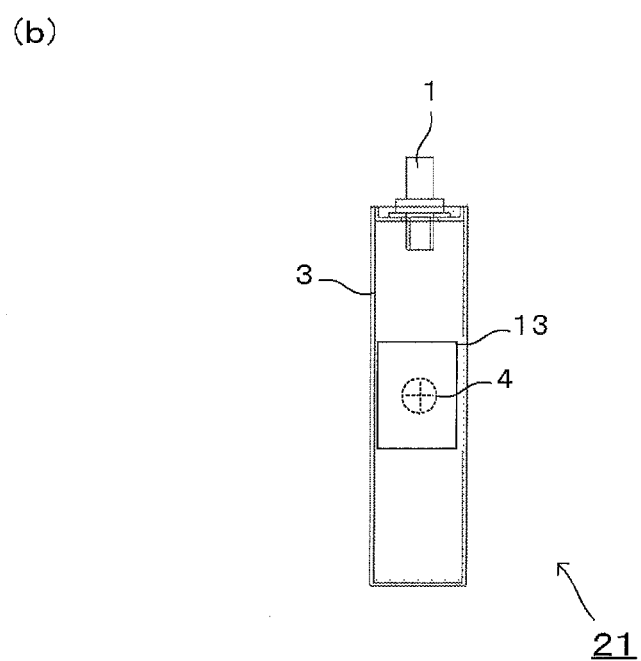

FIG. 1 is a drawing showing an example in which capsule-type gas absorber(s) is/are installed at a nonaqueous electrolyte secondary battery. FIG. 1 (a) is a view as seen from the front; FIG. 1 (*b*) is a view as seen in the direction of arrows X-X at FIG. 1 (*a*). At FIG. 1, note that the positive electrode current collector 7, negative electrode current collector 8, electrode assembly 12, and so forth of FIG. 13 have been omitted.

As shown in FIG. 1, capsule-type gas absorber 13, which contains gas-absorbent material, is housed within battery case 3 at nonaqueous electrolyte secondary battery 21. More specifically, capsule-type gas absorber 13, which is secured by retaining member(s), adhesive, and/or the like, is arranged in the vicinity of explosion prevention valve 4 in such fashion as to cover explosion prevention valve 4 from the interior side thereof.

—Capsule-Type Gas Absorber—

Next, a capsule-type gas absorber is described below.

Figure 2:
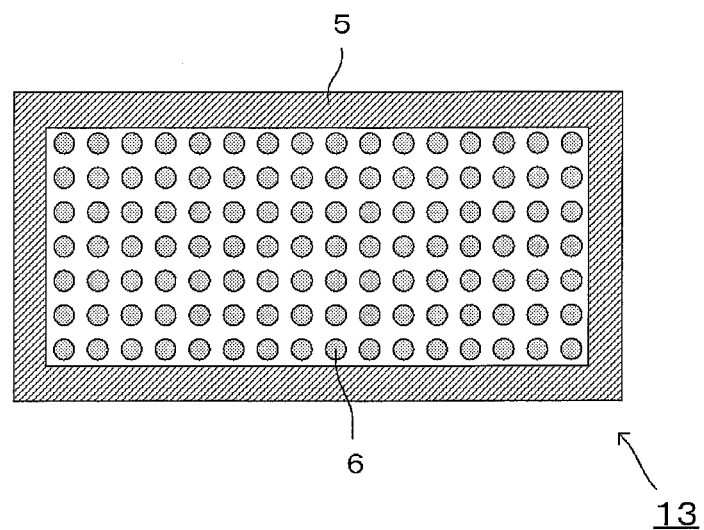
FIG. 2 Drawing showing an example of a capsule-type gas absorber. (a) is a sectional view as seen from the front; (b) is a sectional view as seen from the side.
Figure 2:
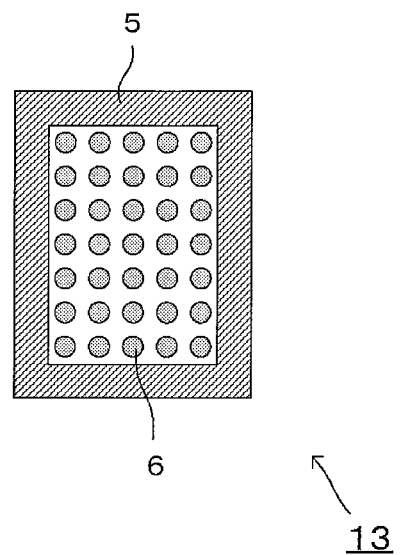

FIG. 2 is a drawing showing an example of a capsule-type gas absorber. FIG. 2 (*a*) is a view as seen from the front; FIG. 2 (*b*) is a view as seen from the side. Capsule-type gas absorber 13 is provided with capsule 5 which is a gas-absorbent-material container, the interior of which is filled with gas-absorbent material 6. Capsule 5 is of hollow construction, being formed from hot-melt resin. As such hot-melt resin, polyethylene, polyolefinic resin, or other such material that melts at on the order of 120 [° C.] to 200 [° C.] may, for example, be used. Furthermore, besides heat, it is also possible to use a material that breaks down under pressure, when it comes in contact with substance(s), or when other such prescribed conditions are present, as capsule 5. Furthermore, based upon considerations of strength and the like, capsule 5 may partly comprise a material other than hot-melt resin.

It is sufficient that gas-absorbent material 6 be a substance that will absorb gas which is produced at the interior of battery case 3; as examples of gas-absorbent material 6, activated carbon, zeolites, carbon black, metals, metal oxides, metal nitrides, intermetallic compounds, and so forth may be cited, but it is preferred that molecular-compound-forming material be employed as gas-absorbent material 6.

Capsule-type gas absorber 13 may be obtained, for example, from a capsule 5 in the form of a hot-melt-resin container having an insertion hole at a portion thereof by inserting gas-absorbent material 6 thereinto via the insertion hole and welding the insertion hole closed so as to seal the gas-absorbent material 6 therewithin. A pouch-like hot-melt-resin container may be employed.

The gas produced at the interior of battery case 3, e.g., in the case of a lithium ion battery, might, for example, be CO, $CO_2$, $CH_4$, $C_2H_4$, $C_2H_6$, $C_3H_6$, $H_2$, and/or the like, total amount of which might be approximately 30 [l] to 200 [l], being approximately 175 [l] for a 70-Ah battery, with gas expulsion rate being approximately 5 [l/sec] to 20 [l/sec].

While absorption of all of the gas produced at the interior of battery case 3 by gas-absorbent material 6 would be difficult from the standpoint of installation space and so forth, it is preferred that gas-absorbent material 6 at least be capable of absorbing poisonous gases such as CO, and/or flammable gases such as $CH_4$.

Furthermore, as gas-absorbent material 6, a plurality of gas-absorbent materials suited for absorbing respective gases may be employed in combination. Where a plurality of gas-absorbent materials are used in combination, a technique may be employed in which these are mixed together in uniform fashion, or the so-called multilayer technique may be used in which layers of like material are stacked together.

When capsule-type gas absorber 13 is housed within battery case 3 of nonaqueous electrolyte secondary battery 21, in the event that temperature and/or pressure rise due to production of gas at the interior of battery case 3, because capsule 5 will melt at a prescribed temperature, spread of gas-absorbent material 6 within the interior of battery case 3 will make it possible for the gas to be absorbed.

Gas-absorbent material 6 may be supported in one or more porous bodies serving as carrier, in which case capsule 5 would be filled with such porous body or bodies. Such porous body or bodies may be of mesh construction, honeycomb construction, or the like.

—Molecular-Compound-Forming Material—

The following characteristics are desired in the molecular-compound-forming material which may be employed as gas-absorbent material 6.

(1) High absorptive capacity with respect to gases. In particular, high absorption rate. Ability to absorb a large amount of gas at high pressure in a short time.

(2) Small size. If the space in which the molecular-compound-forming material is arranged is small, this will make it possible to suppress reduction in battery energy density.

(3) Good heat resistance. For example, ability to absorb gas at 500 [° C.] and higher.

(4) High strength. Ability to withstand high pressure; for example, pressures on the order of 5 [MPa].

(5) Long life. For example, ability to maintain high absorptive capacity even after passage of 5 to 10 years.

(6) Low cost. It is unclear whether gas will need to be absorbed even once over the life of the battery.

(7) Good safety characteristics. The molecular-compound-forming material should not itself be either poisonous or flammable.

The time from generation of gas until convergence thereof varies widely depending on battery size and so forth, and it is preferred that the gas absorber be designed such that there are a plurality of gas-absorbent materials that absorb all such gases, and it is in particular preferred that the molecular-compound-forming material referred to as capable of being employed as such gas-absorbent material should have the foregoing characteristics.

Based upon considerations of efficiency with which contact is made with gas, filling efficiency when a container is filled therewith, and so forth, the molecular-compound-forming material employed should have an average particle diameter of 10 [μm] to 5,000 [μm], preferably 200 [μm] to 300 [μm]; and specific surface area thereof should be not less than 30 [m$^2$/g], preferably not less than 200 [m$^2$/g].

—Molecular Compound—

"Molecular compound" refers to a compound in which two or more compounds capable of stable independent existence are bound together not by covalent bonds but by mutual action of a comparatively weak nature, representative of which would be hydrogen bonds, Van der Waals forces, and the like; such compounds including hydrates, solvates, addition compounds, inclusion compounds, and so forth. Such a molecular compound may be formed as a result of contact reaction between a molecular-compound-forming compound and electrolyte, and may cause electrolyte to change into a compound which is in a solid state.

—Examples of Molecular-Compound-Forming Materials—

As molecular-compound-forming material, inclusion compounds formed by inclusion in which electrolyte acts as host compound as a result of contact reaction between the compound and the electrolyte may be cited. Among molecular-compound-forming materials, known as host compounds that form inclusion compounds by inclusion of electrolyte there are those which are formed from organic compounds, inorganic compounds, and organic/inorganic hybrid compounds; and known as organic compounds, there are monomolecular hosts, multimolecular hosts, macromolecular hosts, and so forth.

As monomolecular host, cyclodextrins, crown ethers, cryptands, cyclophanes, azacyclophanes, calixarenes, cyclotriveratrylenes, spherands, cyclic oligopeptides, and the like may be cited.

Furthermore, as multimolecular host, carbamides, thiocarbamides, deoxycholates, cholates, perhydrotriphenylenes, tri-o-thymotides, bianthryls, spirobifluorenes, cyclophosphazenes, monoalcohols, diols, hydroxybenzophenones, acetylenic alcohols, phenols, bisphenols, trisphenols, tetrakisphenols, polyphenols, naphthols, bisnaphthols, diphenyl methanols, carboxylic amides, thioamides, bixanthenes, carboxylates, imidazoles, hydroquinones, organic ammonium salts, and the like may be cited.

Moreover, as macromolecular host, chitins; chitosans; arm-type polyethylene glycol polymers having 1,1,2,2-tetrakisphenylethane as core; arm-type polyethylene glycol polymers having $\alpha,\alpha,\alpha',\alpha'$-tetrakisphenylxylene as core; and the like may be cited. Furthermore, besides these, organophosphorus compounds, organosilicon compounds, and so forth may be used.

As inorganic host compound, while titanium oxide, graphite, alumina, transition metal dichalcogenite, lanthanum fluoride, clay minerals (montmorillonite, etc.), silver salts, silicates, phosphates, zeolite, magnesium oxide, silica, porous glass, and the like may be cited, inorganic porous materials which are porous are particularly effective, and the porous materials of silica, calcium silicate, magnesium aluminometasilicate, alumina, zeolite, magnesium oxide, magnesium silicate, aluminum silicate, and the like are preferred.

Moreover, there are organometallic compounds which exhibit host compound characteristics, as examples of which organoaluminum compounds, organotitanium compounds, organoboron compounds, organozinc compounds, organoindium compounds, organogallium compounds, organotellurium compounds, organotin compounds, organozirconium compounds, organomagnesium compounds, and the like may be cited. Furthermore, while it is also possible to employ metal salts of organic carboxylic acids, organometallic complexes, and so forth, so long as that which is employed is an organometallic compound, the present invention is not particularly limited hereto.

Any one of these molecular-compound-forming materials may be used singly, or two or more thereof may be used in combination, as absorbent material. While there is no particular limitation with respect thereto so long as it is capable of absorbing electrolyte, organic materials and inorganic porous materials are particularly effective. In specific terms, as solvent for the aforementioned electrolyte, besides ethylene carbonate, propylene carbonate, and other cyclic-carbonate-ester-type high-dielectric-constant/high-boiling-point solvents, low-viscosity solvents, e.g., dimethyl carbonate, ethyl methyl carbonate, diethyl carbonate, and other such short-chain carbonate esters, are employed, and short-chain fatty acid esters are also sometimes employed.

For this reason, as electrolyte-absorbent material, it is preferred that a versatile absorbent material which is such that one absorbent material is capable of inclusion of a plurality of solvents be employed, organic materials and inorganic porous materials being particularly effective.

For example, α-cyclodextrin, β-cyclodextrin, and other such cyclodextrins; calixarenes; carbamide; deoxycholate; cholate; 1,1,6,6,-tetraphenylhexa-2,4-diyne-1,6-diol and other such acetylenic alcohols; 1,1,-bis(4-hydroxyphenyl)cyclohexane and other such bisphenols; 1,1,2,2-tetrakis(4-hydroxyphenyl)ethane and other such tetrakisphenols; bis-β-naphthol and other such naphthols; diphenic acid bis(dicyclohexylamide) and other such carboxylic amides; 2,5,-di-t-butylhydroquinone and other such hydroquinones; chitin; chitosan; silica; calcium silicate; magnesium aluminometasilicate, alumina, zeolite, magnesium oxide, magnesium silicate, aluminum silicate, organometallic compounds; and the like are favorable.

Below, amount of gas absorption was compared using a total of five types of gas-absorbent materials, three of which were molecular-compound-forming materials, these being (1) porous silica, (2) calcium silicate, and (3) magnesium aluminometasilicate; and two of which were ordinary adsorbent materials, these being (4) activated carbon and (5) zeolite. As the gas used to compare these, dimethyl carbonate (hereinafter "DMC") was used, this being a typical electrolyte component which is exemplary of the gas components expelled by lithium ion batteries.

The method used for comparison was as follows.

(a) 1 [g] of sample was first placed in a specimen jar. "Sample" here refers to one of the aforementioned five types of gas-absorbent materials.

(b) DMC was added a little at a time to the specimen jar from (a), and this was mixed by agitation with a spatula (dispensing spoon).

(c) When the sample began to adhere to the spatula and the wall of the specimen jar, this was taken to be the endpoint, and the total weight of DMC added thereto was taken to be the amount of DMC absorbed per 1 [g] of sample. Results of carrying out (a) through (c), above, for the aforementioned five types of gas-absorbent materials are as follows.

Amount of DMC absorbed was (1) 0.47 [g/ml], or 0.13 [g/g], for porous silica, (2) 0.52 [g/ml], or 4.32 [g/g], for calcium silicate, and (3) 0.65 [g/ml], or 1.60 [g/g], for magnesium aluminometasilicate; and was (4) 0.42 [g/ml], or 1.05 [g/g], for activated carbon and (5) 0.40 [g/ml], or 0.86 [g/g], for zeolite.

From the above results, it is clear that the amount of DMC absorbed per unit volume was greater for the foregoing three types molecular-compound-forming materials than it was for activated carbon or zeolite. Furthermore, it is clear that the amount of DMC absorbed per unit weight was greater for calcium silicate and magnesium aluminometasilicate than it was for activated carbon or zeolite. Based on the foregoing, as a result of appropriate selection of material, one can expect to attain an absorptive capacity that is greater both by volume and by weight for molecular-compound-forming materials than for the other, adsorbent materials.

Operation in accordance with the following mechanism at nonaqueous electrolyte secondary battery 21 in FIG. 1 will make it possible to minimize expulsion to the exterior of gas produced at the interior of battery case 3. If, for example, the temperature within battery case 3 begins to rise abnormally due to overcharging, the first thing that will happen is that capsule 5 will melt as a result of having been heated. This will cause gas-absorbent material 6 with which the interior of capsule 5 is filled to spread within the interior of battery case 3. Furthermore, gas-absorbent material 6 will absorb the gas which pervades the interior of battery case 3. Moreover, when pressure within battery case 3 rises and causes actuation of explosion prevention valve 4, the fact that the gas comes in contact with gas-absorbent material 6 in the vicinity of the valve makes it possible to minimize expulsion thereof to the exterior of battery case 3.

Second Embodiment

Figure 3:
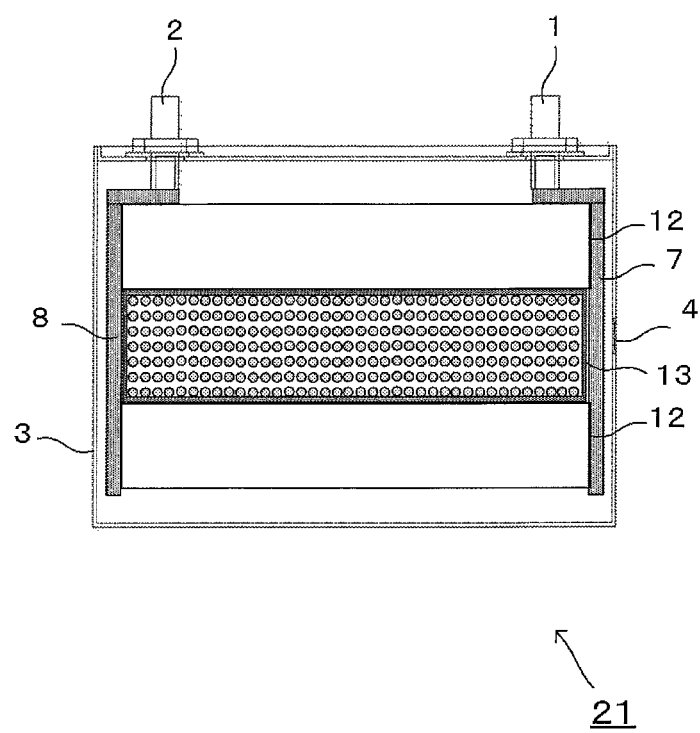
FIG. 3 Drawing showing another example in which capsule-type gas absorber(s) is/are installed at a nonaqueous electrolyte secondary battery.

FIG. 3 is a sectional view as seen from the front, being a drawing showing another example in which capsule-type gas absorber(s) is/are installed at a nonaqueous electrolyte secondary battery.

As shown in FIG. 3, capsule-type gas absorber 13 is arranged at wound core 12a of the electrode assembly at nonaqueous electrolyte secondary battery 21. Capsule-type gas absorber 13, which is fabricated in advance so as to be compatible with respect to the size of wound core 12a, is inserted into wound core 12a after the positive electrode sheet and the negative electrode sheet have been wound together such that the separator intervenes therebetween. At such time, capsule-type gas absorber 13 may be directly retained by wound core 12a of the electrode assembly and/or may be secured by retaining member(s), adhesive, and/or the like.

Operation in accordance with a mechanism similar to that described with reference to FIG. 1 at nonaqueous electrolyte secondary battery 21 in FIG. 3 will make it possible to minimize expulsion to the exterior of gas produced at the interior of battery case 3. Moreover, because nonaqueous electrolyte secondary battery 21 of FIG. 3 has a constitution such that capsule-type gas absorber 13 is housed within the dead space constituted by wound core 12a of the electrode assembly, it is possible to cause an adequate amount of gas-absorbent material 6 to be retained therein with almost no alteration to the structure of the battery.

Third Embodiment

Capsule-type gas absorbers may be installed in distributed fashion throughout the entire interior of battery case 3.

Figure 4:
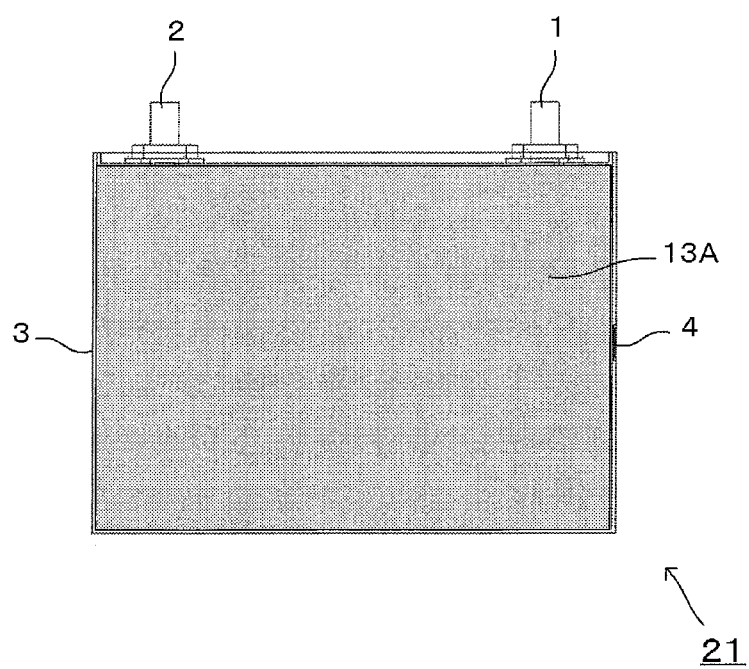
FIG. 4 Drawing showing another example in which capsule-type gas absorber(s) is/are installed at a nonaqueous electrolyte secondary battery.

FIG. 4 is a sectional view as seen from the front, being a drawing showing another example in which capsule-type gas absorber(s) is/are installed at a nonaqueous electrolyte secondary battery. At FIG. 4, note that the positive electrode current collector 7, negative electrode current collector 8, electrode assembly 12, and so forth of FIG. 11 have been omitted. A plurality of capsule-type gas absorbers may be installed in distributed fashion within region 13A, there being no particular limitation with regard to the size, shape, and so forth thereof.

Capsule-type gas absorber(s) may, for example, be installed in distributed fashion throughout the entire interior of battery case 3 as follows:
(1) Gas-absorbent material is treated by coating with hot-melt resin to obtain granular capsule-type gas absorbers.
(2) Capsule-type gas absorbers from (1) are mixed with electrode sheet paste compound, and following application and drying of this, an electrode sheet which includes capsule-type gas absorbers is obtained. At this time, capsule-type gas absorbers may be mixed therewith at the positive electrode sheet, the negative electrode sheet, or both.
(3) The electrode sheets from (2) are wound and are inserted within battery case 3.
(4) When the interior of the battery case 3 from (3) is filled with electrolyte, the electrolyte and the capsule-type gas absorbers are mixed, and capsule-type gas absorbers are distributed within battery case 3.

Fourth Embodiment

Figure 5:
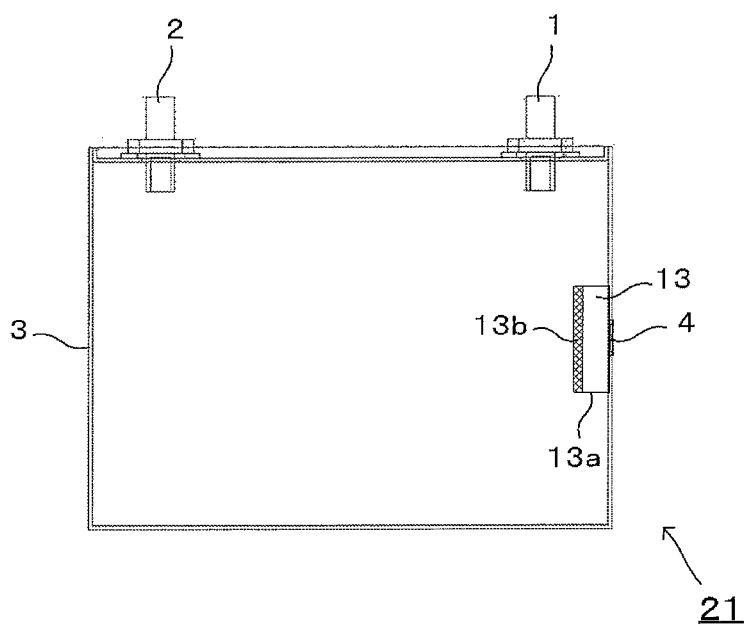
FIG. 5 Drawing showing another example of a capsule-type gas absorber.

FIG. 5 is a drawing showing another example of a capsule-type gas absorber. As shown in FIG. 5, capsule-type gas absorber 13, which contains gas-absorbent material, is housed within battery case 3 at nonaqueous electrolyte secondary battery 21. More specifically, capsule-type gas absorber 13 forms an integral structure together with explosion prevention valve 4; container 13a of gas absorber 13 is provided at one end thereof with explosion prevention valve 4 and is provided at the other end thereof with hot-melt resin 13b which serves as cover after gas-absorbent material has been placed therein; and explosion prevention valve 4 is exposed to the exterior from where it is arranged at the inside side face of battery case 3. Moreover, based upon considerations of strength and the like, container 13a of gas absorber 13 may employ a material different from hot-melt resin and may form an integral structure together with battery case 3.

Fifth Embodiment

Below, modes in which gas-absorbent material may be installed at the exterior of nonaqueous electrolyte secondary battery 21 are next described.

Figure 6:
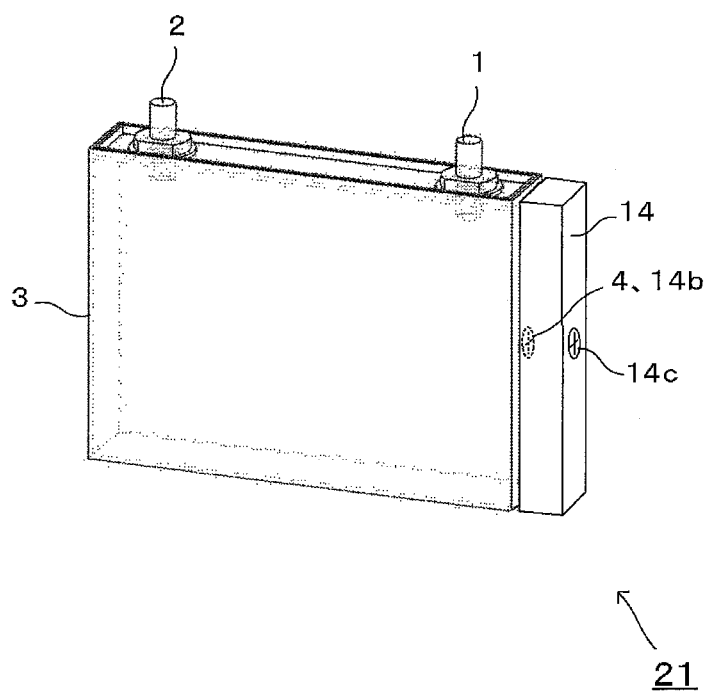
FIG. 6 Perspective view of an example in which cartridge-type gas absorber(s) is/are installed at a nonaqueous electrolyte secondary battery.

FIG. 6 is a perspective view of an example in which cartridge-type gas absorber(s) is/are installed at a nonaqueous electrolyte secondary battery. As shown in FIG. 6, cartridge-type gas absorber 14, which has cartridge valves 14b, 14c, is attached to the exterior of battery case 3 at nonaqueous electrolyte secondary battery 21. More specifically, cartridge valve 14b of cartridge-type gas absorber 14 is directly connected to explosion prevention valve 4. While a variety of attachment methods, including fastening with screws, use of adhesive, and so forth, are conceivable for attachment of cartridge-type gas absorber 14, to permit ease of attachment and/or detachment it is preferred that connectors such as will permit attachment and detachment be provided at both nonaqueous electrolyte secondary battery 21 and cartridge-type gas absorber 14.

—Cartridge-Type Gas Absorber—

Below, a cartridge-type gas absorber is described.

Figure 7:
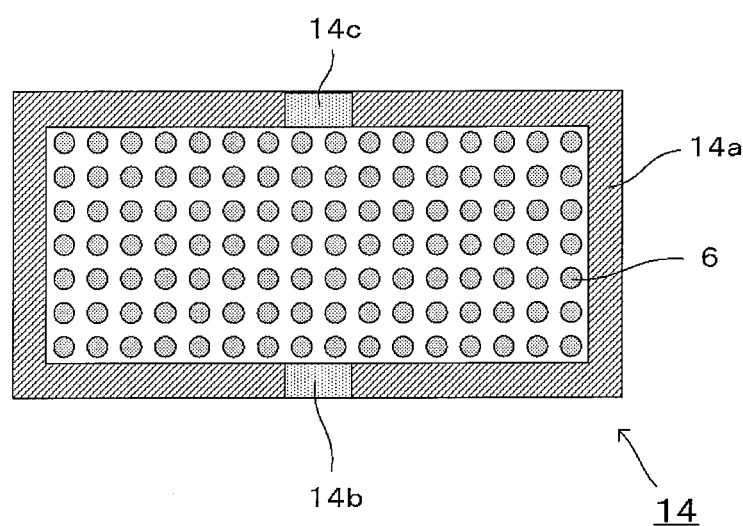
FIG. 7 Drawing showing an example of a cartridge-type gas absorber.

FIG. 7 is a sectional view, as seen from the front, being a drawing showing an example of a cartridge-type gas absorber. Cartridge-type gas absorber 14 includes gas-absorbent material 6 and cartridge case 14a which serves as container for gas-absorbent material. Cartridge case 14a, which is provided with cartridge valve 14b for allowing gas to flow thereinto and with cartridge valve 14c for allowing gas to flow out therefrom, is filled at the interior thereof with gas-absorbent material 6. Note that a plurality of cartridge valve(s) 14b and/or a plurality of cartridge valve(s) 14c may be provided.

As material for cartridge case 14a, metal materials, representative of which might be SUS, Al, Al alloy, Mg alloy, Ti alloy, and the like; fluorinated resins and other such highly corrosion-resistant materials; polypropylene, carbon fiber, and other such lightweight materials; as well as composite materials made from the foregoing, may be cited.

Rather than completely filling the interior of cartridge case 14a with gas-absorbent material 6, it is preferred that space be provided which is on the order of, e.g., 20 percent thereof. This will allow gas-absorbent material 6 to move about freely within cartridge case 14a, which will improve utilization efficiency thereof and thus permit improvement in absorptive capacity with respect to gases.

Cartridge-type gas absorber 14 may be provided with connector(s) for connecting explosion prevention valve 4 and cartridge valve 14b. Where this is done, it will be possible for attachment and/or detachment of nonaqueous electrolyte secondary battery 21 and cartridge-type gas absorber 14 to be easily carried out by means of such connector(s). Furthermore, connector(s) may be provided for mutual connection of cartridge-type gas absorbers 14; specifically, cartridge valve 14b of one cartridge-type gas absorber 14 might be connected to cartridge valve 14c of another cartridge-type gas absorber 14. This will make it possible to connect a plurality of cartridge-type gas absorbers 14 to nonaqueous electrolyte secondary battery 21.

Figure 8:
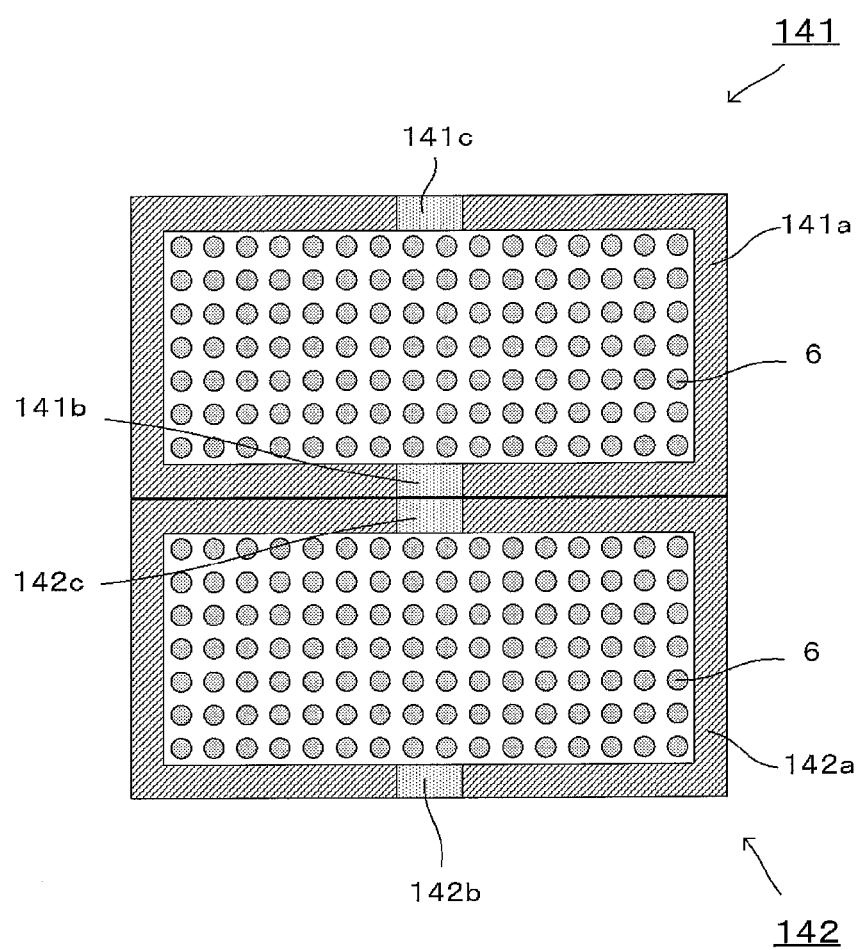
FIG. 8 Drawing showing mutual connection of cartridge-type gas absorbers.

FIG. 8 is a sectional view, as seen from the front, showing mutual connection of cartridge-type gas absorbers. Cartridge valve 141b of upper cartridge-type gas absorber 141 is directly connected to cartridge valve 142c of lower cartridge-type gas absorber 142. Adoption of such constitution will permit overall improvement in absorptive capacity with respect to gases.

With regard to the connection to be made with the cartridge-type gas absorber, while there is no particular limitation with respect thereto so long as it is highly airtight and is of such size and shape as to permit attachment to and detachment from the explosion prevention valve of the battery, it is preferred that the diameter of the opening at the cartridge-type gas absorber be larger than the diameter of the opening at the explosion prevention valve of the battery, and it is also preferred that the gas outlet valve be set to open at a pressure that is higher than the pressure at which the gas inlet valve is set to open.

Cartridge-type gas absorber 14 may be provided with temperature indicator label(s), test strip(s), and the like. By so doing, it will be possible to determine when it is time to replace cartridge-type gas absorber 14. Furthermore, cartridge-type gas absorber 14 may be recycled under prescribed conditions if the gas-absorbent material therein is still unspent at the end of the battery service life.

Operation in accordance with the following mechanism at nonaqueous electrolyte secondary battery 21 in FIG. 6 will make it possible to reduce expulsion to the exterior of gas produced at the interior. If, for example, the temperature within battery case 3 rises abnormally due to overcharging, gas will be produced within battery case 3, following which pressure at the interior will rise, causing actuation of the explosion prevention valve. The gas will flow from explosion prevention valve 4 by way of cartridge valve 14b into the interior of cartridge case 14a, and will be absorbed as a result of coming in contact with gas-absorbent material 6. This being the case, the gas will not be expelled to the exterior. Furthermore, even if pressure within cartridge case 14a should rise due to clogging or the like of cartridge-type gas absorber 14, actuation of cartridge valve 14c will prevent cartridge case 14a from rupturing.

Sixth Embodiment

There are a variety of ways in which gas-absorbent material 6 may be supported at the interior of cartridge-type gas absorber 14. Overall improvement in absorptive capacity with respect to gases may be achieved through employment of method(s) of supporting gas-absorbent material 6 that are optimal for the respective gases and manner of use.

Figure 9:
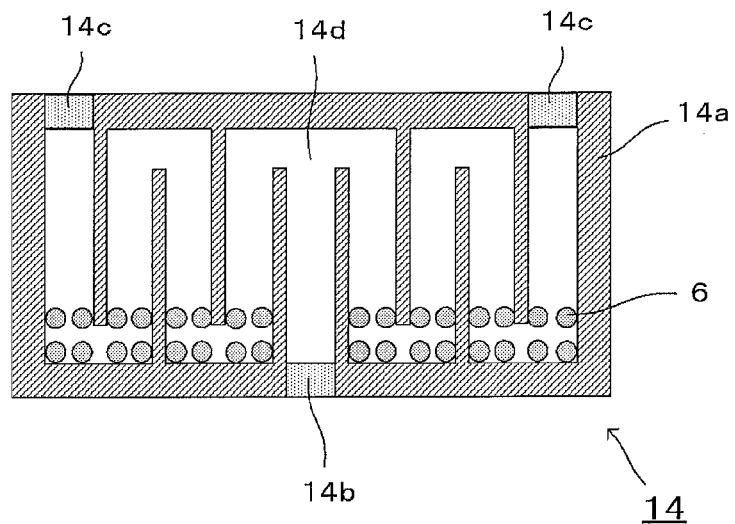
FIG. 9 Drawing showing an exemplary constitution of a method of supporting gas-absorbent material. (a) is a drawing showing an example of a method of supporting gas-absorbent material; (b) is a drawing showing another example of a method of supporting gas-absorbent material.
Figure 9:
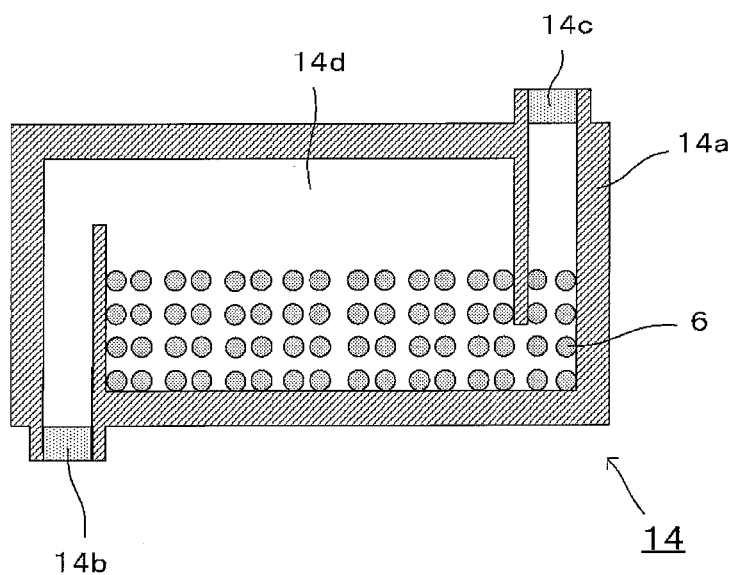

FIG. 9 is a drawing showing an exemplary constitution of a method of supporting gas-absorbent material. FIG. 9 (a) is a drawing showing an example of a method of supporting gas-absorbent material. Cartridge case 14a is provided with cartridge valve 14b at center in the lower portion thereof and with cartridge valves 14c at either end in the upper portion thereof. Formed at the interior of cartridge case 14a is gas passage 14d which meanders up and down in labyrinthine fashion, gas-adsorbent material 6 being supported at the lower portion thereof.

FIG. 9 (b) is a drawing showing another example of a method of supporting gas-absorbent material. Cartridge case 14a is provided with cartridge valve 14b at one end in the lower portion thereof and with cartridge valve 14c at the other end in the upper portion thereof. Formed at the interior of cartridge case 14a is gas passage 14d which meanders up and down in labyrinthine fashion, gas-adsorbent material 6 being supported at the lower portion thereof.

The methods of supporting gas-absorbent material 6 shown at FIGS. 9 (a) and (b) allow gas to be brought into contact with gas-absorbent material 6 for a long time and permit overall improvement in absorptive capacity with respect to gases.

Furthermore, cartridge-type gas absorber 14 may be such that a portion of the interior of cartridge case 14a is made to have honeycomb construction, with gas-absorbent material 6 being supported thereby.

Furthermore, cartridge-type gas absorber 14 may be such that cartridge case 14a is provided with a plurality of micropores and cavities for retention of gas-absorbent material 6.

Seventh Embodiment

In an embodiment in which a plurality of nonaqueous electrolyte secondary batteries 21 are used in an arrangement (hereinafter "modular" arrangement) in which they are arranged in row(s), cartridge-type gas absorber(s) 14 may be attached to discharge orifice(s) of tubing manifold(s) connected to respective explosion prevention valves 4.

Figure 10:
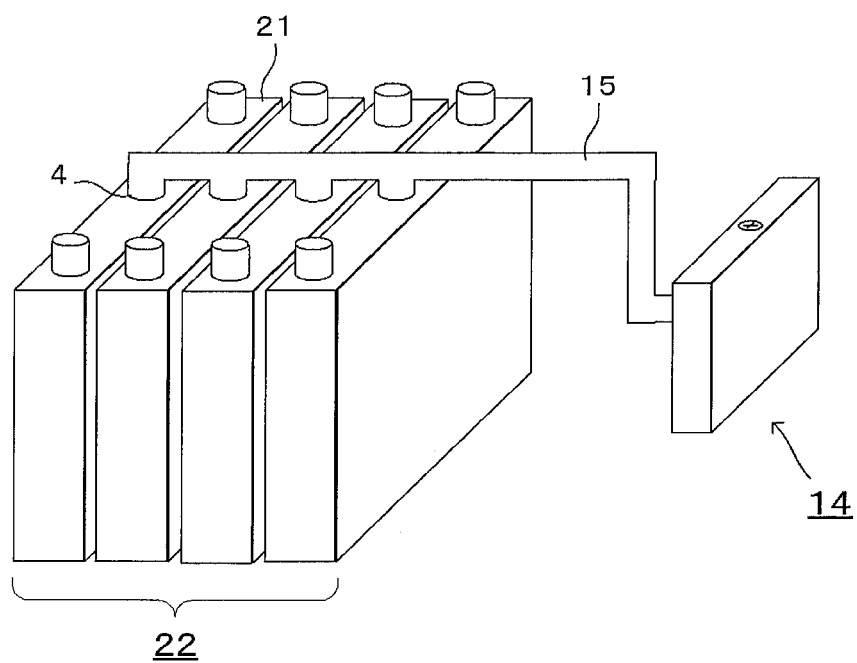
FIG. 10 Drawing showing an example in which a cartridge-type gas absorber is attached to a discharge orifice of a tubing manifold.

FIG. 10 is a drawing showing an example in which a cartridge-type gas absorber is attached to a discharge orifice of a tubing manifold. As shown in FIG. 10, cartridge-type gas absorber 14 is directly attached to the discharge orifice of tubing manifold 15. Such a secondary battery system makes it possible for gas discharged from module 22 to be absorbed in collective fashion. As has been mentioned, a plurality of cartridge-type gas absorbers 14 may be connected in correspondence to the gas(es) to be absorbed.

Whereas in the present embodiment cartridge-type gas absorber(s) 14 were directly connected to discharge orifice(s) of tubing manifold(s), it is also possible, e.g., where gas is collected within a container at a central location before being subjected to some treatment or the other, cartridge-type gas absorber(s) 14 may be attached to the container at such central location.

Furthermore, cartridge-type gas absorber(s) 14 may be attached at interior(s) of tubing manifold(s). Furthermore, instead of employing tubing manifold(s), cartridge-type gas absorber 14 may be provided with a plurality of cartridge valves 14b, cartridge valves 14b being respectfully directly connected to explosion prevention valves 4.

Eighth Embodiment

Figure 11:
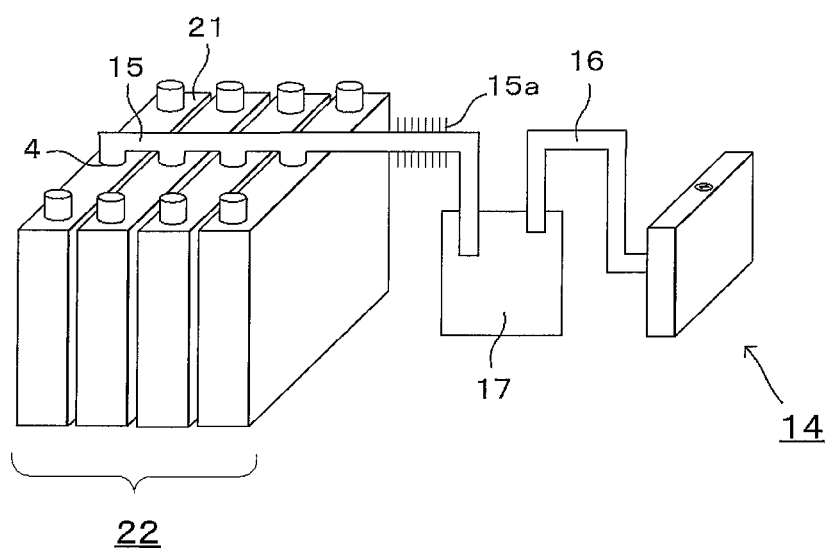
FIG. 11 Drawing showing another example in which a cartridge-type gas absorber is attached to a discharge orifice of a tubing manifold.

FIG. 11 is a drawing showing another example in which cartridge-type gas absorber(s) are attached to discharge orifice(s) of tubing manifold(s). As shown in FIG. 11, cartridge-type gas absorber 14 is directly attached to the discharge orifice of tubing 16. At FIG. 11, gas discharged from module 22 is sent to cartridge-type gas absorber 14 by way of, in order, tubing manifold 15 which has heat-dissipating means 15a, liquid storage means 17, and tubing 16. At such a secondary battery system, because component(s) of gas discharged from module 22 which are capable of being liquefied when cooled are removed in advance by storage of same at liquid storage means 17, cartridge-type gas absorber 14 need only absorb only the other gas component(s), permitting cartridge-type gas absorber 14 to be used efficiently. It being sufficient that heat-dissipating means 15a be capable of cooling gas which is expelled from explosion prevention valve(s) 4, a plurality of cooling fins, radiator, or the like may be employed therefor. Furthermore, liquid storage means 17 may employ filter(s) and/or container(s) in correspondence to liquid(s) from respective gas components, and so forth.

While the foregoing embodiments have been described in terms of examples employing nonaqueous electrolyte secondary batteries, the foregoing embodiments may be applied in general to any battery in which, like a nonaqueous electrolyte secondary battery, gas is produced at the interior thereof.

INDUSTRIAL UTILITY

The present invention permits installation of gas absorber(s) including gas-absorbent material(s) in configuration(s) suited to battery interior(s) and/or exterior(s) for preventing expulsion of flammable and/or poisonous gas(es) produced at battery interior(s), the industrial utility of which is extremely significant, particularly in light of the environmentally friendly aspects thereof.

EXPLANATION OF REFERENCE NUMERALS

1 Positive electrode terminal
2 Negative electrode terminal
3 Battery case
4 Explosion prevention valve
5 Capsule (container for gas-absorbent material)
6 Gas-absorbent material
7 Positive electrode current collector
8 Negative electrode current collector
9 Separator
10 Positive electrode sheet
11 Negative electrode sheet
12 Electrode assembly
12a Wound core of electrode assembly
13 Capsule-type gas absorber
13a Region within which a plurality of capsule-type gas absorbers are distributed
14 Cartridge-type gas absorber
14a Cartridge case (container for gas-absorbent material)
14b Cartridge valve (inlet)
14c Cartridge valve (outlet)
14d Passage
15 Tubing manifold
15a Heat-dissipating means
16 Tubing
17 Liquid storage means
21 Nonaqueous electrolyte secondary battery
22 Module

The invention claimed is:

1. A battery comprising:
a case in which a positive electrode and a negative electrode are sealed together with electrolyte;
an explosion prevention valve for allowing escape of high-pressure gas at an interior of the case when pressure within the case rises; and
a gas absorber for absorbing the high-pressure gas,
wherein the gas absorber includes
gas-absorbent material;
a cartridge case which houses, at an interior thereof, the gas-absorbent material;
a gas inlet valve for causing the high-pressure gas to flow thereinto; and
a gas outlet valve, which opens at a higher pressure than a pressure at which the gas inlet valve opens, for causing the high-pressure gas to flow out therefrom; and
wherein the gas absorber is provided outside the case.

2. The battery according to claim 1
wherein the gas absorber further includes a first connector for attachment to and detachment from the battery; and
the gas inlet valve is directly connected to the explosion prevention valve by means of the first connector.

3. The battery according to claim 1
wherein the gas absorber further includes a second connector for connecting the gas inlet valve and the gas outlet valve.

4. The battery according to claim 1
wherein the gas-absorbent material occupies 50 percent to 90 percent of the entire volume enclosed by the container enclosure.

5. The battery according to claim 1
wherein formed at the cartridge case is a passage for causing high-pressure gas to flow up and down therewithin; and
wherein the gas-absorbent material is supported at an interior of the passage.

6. The battery according to claim 1
wherein the gas-absorbent material is a molecular-compound-forming material.

7. A battery system comprising:
a plurality of batteries according to claim 1; and
a tubing manifold equipped with a plurality of gas inlet orifices and a gas outlet orifice;
wherein the gas absorber further comprises a third connector for attachment to and removal from the tubing manifold;
wherein the respective explosion prevention valves are connected to the gas inlet orifices; and
wherein the gas outlet orifice is connected to the gas inlet valve by means of the third connector.

8. The battery system according to claim 7
wherein the tubing manifold further comprises heat-dissipating means for cooling expelled electrolyte and a gas component; and
wherein liquid storage means that stores a liquefied component is provided between the tubing manifold and the gas absorber.

9. The battery system according to claim 7
wherein the gas-absorbent material is a molecular-compound-forming material.

10. The battery according to claim 1
wherein the battery is a secondary battery.

11. The battery system according to claim 7
wherein the battery is a secondary battery.